United States Patent [19]

Haberman

[11] 4,015,584
[45] Apr. 5, 1977

[54] PARABOLIC SOLAR ENERGY HEAT EXCHANGER

[76] Inventor: Louis B. Haberman, c/o Solarex Hydraulics Corp., 14 Lucon Drive, Deer Park, N.Y. 11729

[22] Filed: Aug. 18, 1975

[21] Appl. No.: 605,757

[52] U.S. Cl. .............................. 126/271; 126/270; 350/299
[51] Int. Cl.² ........................................... F24J 3/02
[58] Field of Search ........... 126/270, 271; 237/1 A; 350/288, 293

[56] References Cited

UNITED STATES PATENTS

| | | | |
|---|---|---|---|
| 2,594,232 | 4/1952 | Stockstill | 126/271 |
| 2,595,905 | 5/1952 | Telkes | 126/270 |
| 2,872,915 | 2/1959 | Bowen | 126/271 |
| 2,907,318 | 10/1959 | Awot | 126/270 |
| 2,908,795 | 10/1959 | Branstrom | 126/270 |
| 2,920,710 | 1/1960 | Howard | 126/270 |
| 3,022,781 | 2/1962 | Andrassy | 126/271 |
| 3,875,926 | 4/1975 | Frank | 126/271 |
| 3,884,217 | 5/1975 | Wartes | 126/270 |

Primary Examiner—Kenneth W. Sprague
Assistant Examiner—James C. Yeung
Attorney, Agent, or Firm—Richard L. Miller

[57] ABSTRACT

A solar energy heat exchanger including a housing formed by parabolic shaped walls and a transparent front plate connecting the walls. A longitudinal focal tube is positioned about the focal line of the parabolic housing. The transparent front plate is faced toward the sun, permitting the rays to pass therethrough, some of which pass onto the front part of the focal tube. The inner surface of the parabolic walls reflect the rest of the sun rays which pass into the housing, and send the reflected rays to the back part of the focal tube. A plurality of flow tubes can be positioned adjacent the inner surface of the parabolic walls to receive the sun rays as well. The flow tubes can have reflective coatings around them to aid in reflecting the sun rays on to the focal tube. A top and bottom cover on the parabolic housing have holes therein which are located above and below both the focal tube and the flow tubes, permitting a pipe assembly to connect to the tubes for providing the entry and exit of a fluid into the tubes. The solar energy heat exchanger can be placed inside a dwelling, with the transparent front plate serving as the actual windowpane of a window aperture.

28 Claims, 9 Drawing Figures

U.S. Patent  April 5, 1977  Sheet 1 of 2  4,015,584
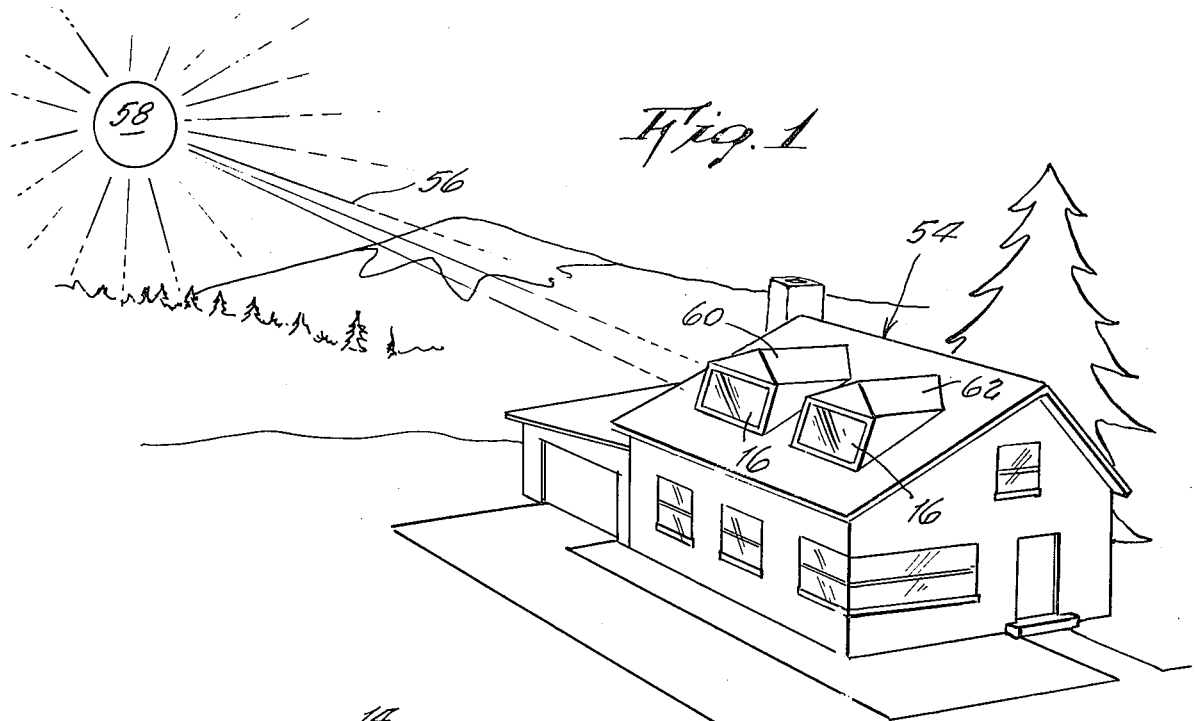
*Fig. 1*
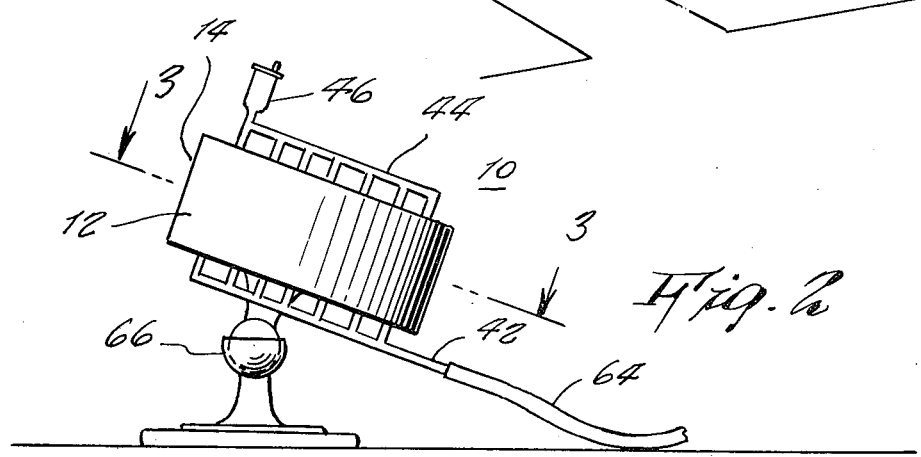
*Fig. 2*
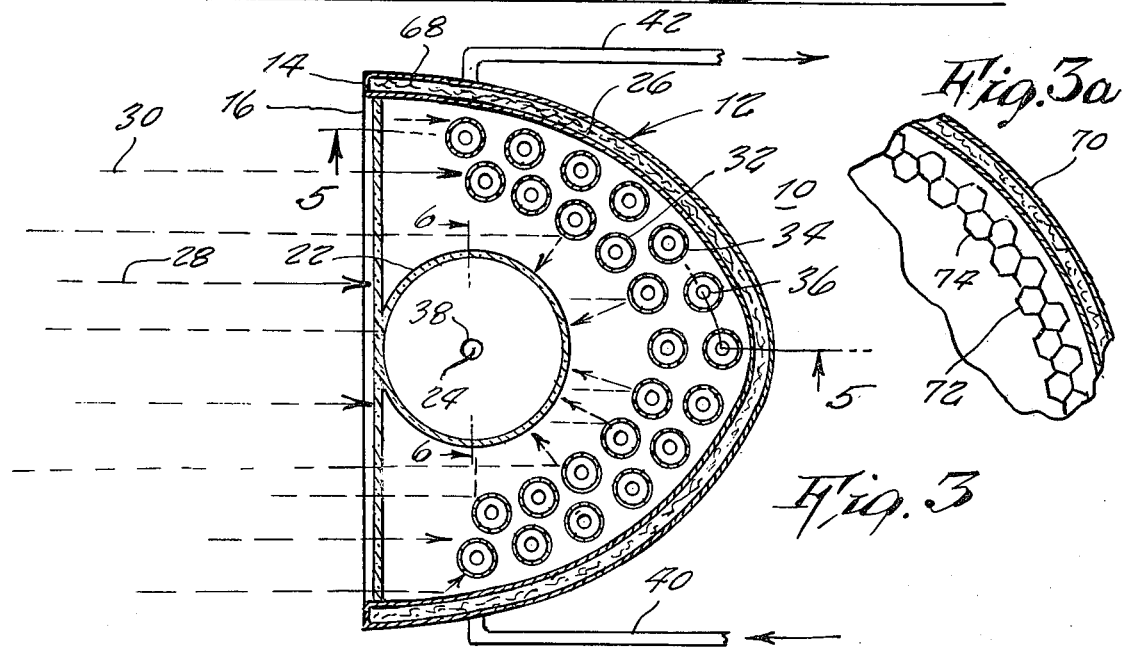
*Fig. 3*  *Fig. 3a*

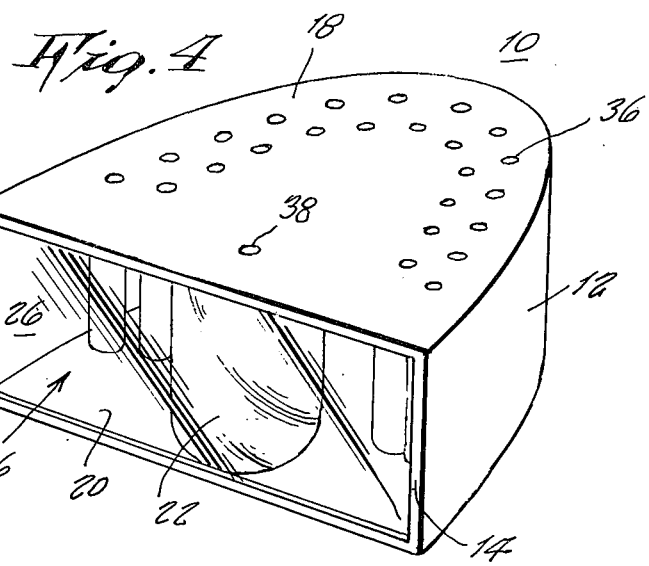
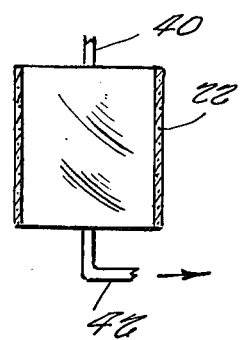
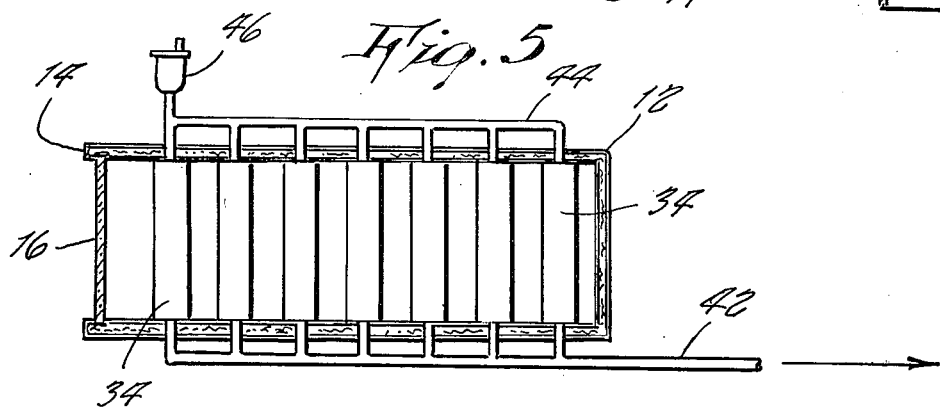
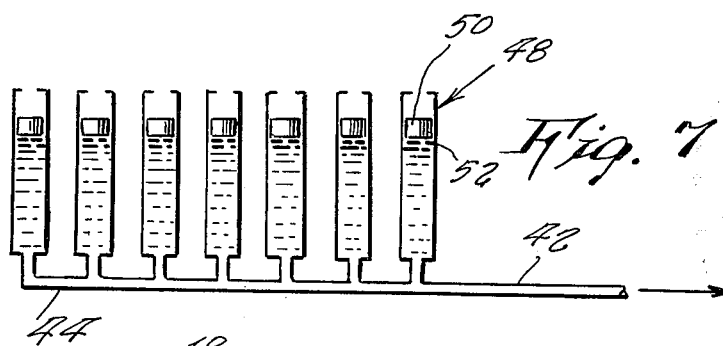
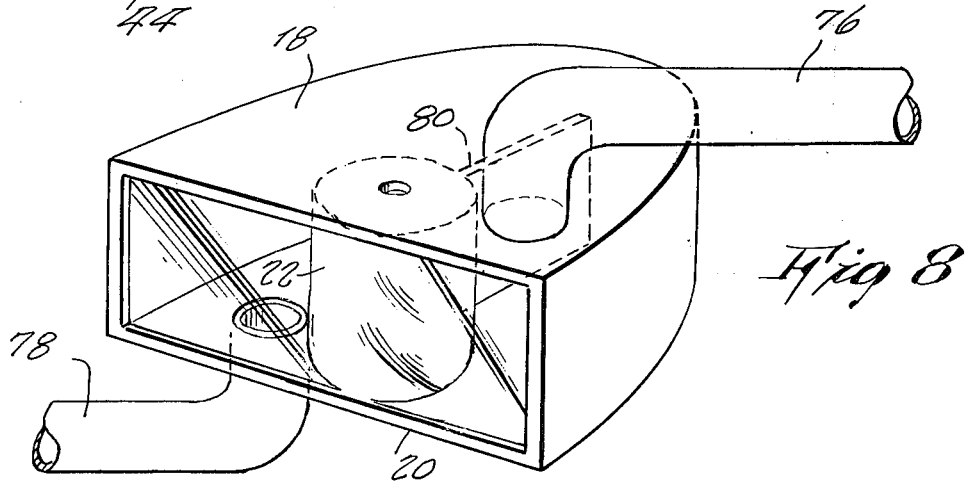

PARABOLIC SOLAR ENERGY HEAT EXCHANGER

BACKGROUND OF THE INVENTION

1. Field of the Invention

This invention relates to heat exchangers and more particularly to a solar energy heat exchanger utilizing a modular mobile device.

2. Description Of The Prior Art

With the reduction in the supply of fossil fuel and the resulting increased cost of such fuel, other sources of energy are being sought for heating purposes. One such source of energy which is well known in the art, is of course solar energy. Solar energy heat exhangers have therefore been available which convert the energy obtained from the sun's rays making them useful for heating purposes and mechanical motion. Most of the prior art solar energy heat exchangers employ large flat installations which can receive large amounts of the sun rays. Because of the inefficient conversion ratio of the sun's energy to heat, the receiving area is made large to compensate for such inefficiency. However, because of such large receiving areas, in order to utilize such heat exhangers there is required extensive modifications to existing structures with the necessity of utilizing large portions of such structures for the heat exhanger and resulting high cost of installation. While the flat panel method is required to capture the sun's energy, even such systems are not fully efficient since secondary heat is wasted in such heat exchangers. Additionally, most known heat exchangers are permanent installations and cannot be moved to accommodate smaller areas or changed circumstances.

Accordingly, it is an object of the present invention to provide a parabolic solar energy heat exchanger which avoids the aforementioned problems of prior art systems.

A further object of the present invention is to provide a solar energy heat exchanger using a parabolic housing to provide greater efficiencies.

Still another object of the present invention is to provide a solar energy heat exchanger utilizing a transparent front plate which can serve as a windowpane as well as serving as the receiver for the heat exchanger.

A further object of the present invention is to provide a solar energy heat exchanger which can be easily moved and is modular in form so as to permit cascading of a number of such heat exchangers.

Yet a further object of the present invention is to provide a solar energy heat exchanger which can use the sun's rays to heat a fluid flowing within the system.

Another object of the present invention is to provide a solar energy heat exchanger having a main tube flowing as well as secondary tubes, such that the main tube can provide the heating for a dwelling and the secondary tubes provide the hot water for such dwelling.

Still another object of the present invention is to provide a solar energy heat exchanger which can be used to provide heat for the heating system of the dwelling through radiation and conduction means, as well as localized heating of the surrounding area by convection means.

Yet a further object of the present invention is to provide a solar energy heat exchanger which can be easily assembled on site without the need of skilled installers.

A further object of the present invention is to provide a solar energy heat exchanger which can be used either in conjunction with a liquid such as water, or a gas such as air.

Still a further object of the present invention is to provide a solar energy heat exchanger which can easily interconnect to a standard heating system existing within a dwelling.

Yet a further object of the present invention is to provide a parabolic solar heat exhanger which is simple in construction, economic in manufacture, and efficient in use.

Still another object of the present invention is to provide a solar energy heat exchanger wherein saturated steam conditions are ascertained due to concentration onto the focal tube of sun's rays and reflected. Saturated steam can be used as a working medium to operate a compressor which in turn can operate refrigeration or air conditioning equipment. This is the cooling aspect of the invention which will permit on a 100° day utilization of the sun's rays for cooliing an entire dwelling whereas current methods must utilize inefficient fossil fuel plants to transmit electricity to operate air conditioning to withdraw heat generated on a summer's day.

These and other objects, features and advantages of the invention, will, in part, be pointed out with particularity, and will, in part, become obvious from the following more detailed description of the invention, taken in conjunction with the accompanying drawings, which form as integral part thereof.

SUMMARY OF THE INVENTION

Briefly, the invention comprises a solar energy heat exchanger including wall structures shaped into an open ended parabolic housing and having a transparent front plate connecting the ends of the parabolic housing. Sun's rays are capable of passing through the transparent front plate into the housing. The inner surface of the parabolic housing internally reflect at least some of the sun's rays which reach it through the front plate. A longitudinal focal tube is positioned about the focal line of the parabolic housing and receives both direct sun rays passing through the front plate as well as reflected sun rays from the inner surface of the parabolic walls. A fluid medium can pass through the focal tube and be heated by the heat of the sun rays received onto the focal tube.

A top and bottom cover is placed on the parabolic housing to form a complete enclosure therewith. Flow tubes can be positioned adjacent the inner surface of the parabolic walls to additionally reflect the sun rays onto the focal tube. A fluid can also flow through the flow tubes to provide separate heating of that fluid, or to provide pre-heating of a fluid which will ultimately pass into the focal tube.

BRIEF DESCRIPTION OF THE DRAWINGS

In the drawings:

FIG. 1 is a perspective view of the present invention shown installed in a house, for operative use;

FIG. 2 is a side elevation view of the solar energy heat exchanger of the present invention.

FIG. 3 is an enlarged cross sectional view taken along line 3—3 of FIG. 2.

FIG. 3A is a fragmentary sectional view of a modified embodiment of the structure showing an extruded honeycombed construction;

FIG. 4 is a perspective view of the device showing the top and front sections thereof;

FIG. 5 is a cross sectional view taken along line 5—5 of FIG. 3;

FIG. 6 is a cross sectional view taken along line 6—6 of FIG. 3;

FIG. 7 is a diagrammatic view showing a modified design of the structure shown in FIG. 6, and FIG. 8 is a view similar to that shown in FIG. 4 and showing a modified design permitting the movement of hot air as the flowing fluid.

In the various figures of the drawings, like reference characters designate like parts.

DESCRIPTION OF THE PREFERRED EMBODIMENT

Referring now to FIGS. 2, 3 and 4 there is shown the solar heat exchanger 10 of the present invention including a wall structure 12 shaped in the form of a parabola. The ends 14 of the parabolic shaped walls are open and are interconnected by means of a transparent front plate 16. A top cover 18 and a bottom cover 20 complete the enclosure of the heat exchanger.

Positioned within the heat exchanger is a focal tube 22 (FIG. 6) extending longitudinally throughout the height of the heat exhanger. The focal tube is positioned about the focal line 24. Such focal line is formed by the locus of focal points for the parabolic curved wall 12. The focal tube walls can be made of glass such as pyrex glass.

The transparent front plate 16 would be positioned to face the sun and thereby receive the rays of the sun which can pass through the front plate and into the housing. The inner surface 26 of the walls 12 is made at least partially reflective such that rays passing through the front plate onto the parabolic walls 12 will be reflected from the walls in a direction towards the focal line. The focal tube will receive diret sun rays 28 passing through the transparent front plate and onto the focal tube wall. Additional rays passing into the housing 30 will be reflected off the inner surface of the housing walls and onto the focal tube. Approximately one-half of the focal tube, and specifically the front semi-cylindrical portion thereof, will receive the direct sun rays; while the rear half, and specifically the back semi-cylindrical surface thereof, will receive the reflected sun rays. In order to increase the efficiency, it is possible to make the front half of the focal tube transparent to direct sun rays and the rear half of the focal tube absorptive to reflected rays. Such absorption can be achieved by painting the rear half of the cylindrical tube black. Additionally, other absorptive material can be coated onto the rear surface of the focal tube.

In addition to the focal tube, additional tubes can be included within the parabolic housing. A first plurality of such flow tubes 32 is positioned adjacent to the inner surface of the parabolic walls at spaced interwalls along a first parabolic line parallel to the parabolic housing walls. The flow tubes can be made of glass, or of a reflective material such as aluminum. When made of reflective material, these tubes serve to aid in the reflection of sun rays passing through the front plate and into th parabolic housing.

A second plurality of flow tubes 34 can also be included. Flow tubes 34 are located in spaced apart relationship along a second parabolic line parallel to the parabolic housing wall and positioned between the parabolic housing wall and the first parabolic line containing the first plurality of flow tubes 32. Tubes 34 can also be made either of glass or of a reflective material such as aluminum, whereby they will also serve to reflect the sun rays passing through the transparent front plate.

Focal tube 22 can be positioned in a spaced relationship from the transparent front plate. Alternately, if both the front plate and the focal tube are make of glass, such as Pyrex glass, it is possible to form the focal tube as in integral part of the front plate and make them both a single molded one-piece construction. This will even further increase the efficiency of the unit.

The top and bottom plates includes holes 36 in registration with each of the flow tubes and a holes 38 in registration with the focal tube. The bottom holes would typically be identical to the holes in the top cover. The holes can be made smaller than the actual size of the tube to permit the fluid to remain within the tube a greater period of time and be heated to a higher temperature.

A pipe assembly, shown in FIGS. 2 and 5 is included to bring the fluid into the system, pass it through the various tubes and then bring it out of the heat exchanger. The fluid will enter along line 40 (FIG. 3) and exit along line 42. The fluid will flow into the outermost set of tubes 34 and then pass through the pipe assembly 44 going from one tube to the next adjacent tube. A float valve 46 is shown included within the system to assure the proper pressure within the system and to bleed off excess air that may accumulate with the pipe assembly. Such float valves are well known in the heating industry. After the fluid has passed through the outer flow tubes 34, the fluid can then pass into the inner flow tubes 32. Since the inner tubes 32 are closer to the front plate 16, they will receive a higher temperature from the sun rays. Utilizing the two rows of flow tubes, the outermost row will permit the return of the line fluid from the heating pipe. The fluid on its return has had its heat dissipated within the pipes of the dwelling heating system. This return fluid will then first pass through the outer tubes and be gradually heated. Then, the fluid will pass into the inner flow tubes to be additionally heated. The system can then include pipes whereby all of the fluid from the inner flow tubes will pass into the focal tube to receive the greatest amount of heat. This gradual heating from the outer flow tubes to the inner flow tubes and then to be focal tube prevents heat shock to the materials and improves the efficiency of the system. From the focal tube the fluids can then pass out along line 42 to the heating system within the dwelling to pass through radiators and other equipment used for heating.

Alternately, it is possible to have a double flow fluid system. Specifically, the inner focal tube can be utilized for the heating of the dwelling. The focal tube fluid will of course attain the highest heat in the heat exchanger. The flow tubes including both the inner and outer groupings can be used to provide the hot water for the dwelling. Such hot water need not be heated to the same high temperature which is used for heating that radiators and accordingly the lower temperature from the flow tubes will be satisfactory for such hot water system.

Instead of utilizing the float valve 46 to control the proper pressure in the system, it is possible to utilize a plurality of piston valves 48, as shown in FIG. 7. Such piston valves would include a piston 50 positioned within a cylinder 52 and preset for a fixed amount of pressure. For example, the pressure from the hot air can be set at about 5 psi for safe functioning. A single piston can be provided for each of the tubes to control the proper pressure within the tubes of the heat exchanger.

Referring now to FIG. 1, there will be seen how the present invention is installed in a dwelling for operative use. The heat exchanger can be moved to a suitable position within the dwelling and can be erected on site utilizing predesigned equipment which can be erected without the use of skilled labor. A plumber can then interconnect the pipes of the heat exchanger to the existing boiler system of the dwelling. Because the transparent front plate of the heat exchanger is of substantially rectangular shape, this front plate can be utilized in place of a window pane in the dwelling. As shown in FIG. 1, the house 54 is being heated by means of solar energy by receiving the sun rays 56 emitted by the sun 58. The heat exchangers of the present invention are installed in the dormer windows 60 and 62 such that the transparent front plate 16 serves as the window panes of such dormer windows. By utilizing the transparent front plates themselves as window panes, there is removed an extra layer of glas which would retard the sun rays from being passed into the heat exchanger. Since the heat exchanger of the present invention includes very simple structural parts, the size of the heat exchanger can be designed to permit the transparent front plate to exactly fit the window frame so that the transparent front plate will serve as a tight fitting window pane into the frame.

Because the heat exchanger of the present invention is mobile, it is possible to remove the heat exchanger from a particular window and move it to another window when circumstances within the dwelling change. Thus, particular areas of the dwelling can be heated at particular times of the day by locating the heat exchanger at different positions. At each location it is merely necessary to interconnect the inlet and outlet tubes of the head exchanger to existing pipes. Such can be done by means of a hose 64 (FIG. 2) or through a valve means as is known.

Initial installation of the system can be achieved without any major structural modeling by simply placing the unit at a particular location or, removing the window and utilizing the heat exchanger of the present invention as a substitute for the existing window. The heat exchanger can be used either for homes, factories, schools or large apartment buildings. Since the heat exchangers can be cascaded, or connected in parallel, more than one unit can be utilized for larger areas.

The only part of the unit which is outside of the dwelling is the transparent front plate, when used in place of a window pane. However, the parabolic housing with the top and bottom covers and the pipe assembly are all located indoors of the dwelling, and therefore, the life expectancy of all the materials, except the front glass pane, will be indifinite since they will not be subject to the outside ambient elements. When utilizing a number of the units together, it is possible to dovetail the unit into a common header leading to a pumping unit and a tank assembly.

When utilizing the parabolic solar energy heat exchanger on a roof or other upper surface of the dwelling, it is possible to connect a follower device 66 (FIG. 2) which can detect and follow the trajectory of the sun's path. Such follower device connected to the heat exchanger will permit the movement of the heat exchanger during the course of the day such that the transparent front plate will always be facing the position of the sun to always receive the greatest amount and most intense sun rays.

The walls of the parabolic housing can include a layer of insulation 68 which can prevent heat generated by the sun rays from passing out of the housing, and instead, will retain all of the heat within the housing to provide a greater efficiency of heat exchange from the sun rays to the focal tubes. However, when the heat exchanger is located within a dwelling, it may be desirious that less insulation be contained within the walls to thereby permit the walls themselves to heat up. In this way the ambient atmosphere around the housing will be heated by means of convection, and the heat exchanger can be utilized not only to provide heating of the fluid contained in the tubes by means of conduction and radiation, but also provide heating to the ambient atmosphere around the exchanger by means of convection.

The heat exchanger of the present invention provides a much more efficient device than has heretofore been obtained. The reason is because of the peculiar shaped construction of the housing. By using a parabolic housing structure, most of the reflected rays of the housing will be focused onto the focal point of the parabola wherein there is positioned the focal tubes. In most other heat exchangers the secondary heating resulting from the reflection of the sun rays off the surfaces, is generally wasted.

By way of example, a typical unit can be constructed of approximately 4 feet high, 2 feet across, and 18 inches deep. Such device could utilize a focal tube of ½ inch thick Pyrex glass having a 4 inch inside diameter and being 4 feet long, whereby it extends the full height of the housing. With the fluid being that of water, the BTU output from the device will be approximately 15,000 BTU's/hour and producing 150 lbs. of water with a 100° F. temperature rise. The total temperature difference between th ambient conditions and that of the focal tube can be as high as 350° F. The inner and outer flow tubes can be machined directly from aluminum plate. The transparent front plate can be constructed of ½ inch Pyrex glass panel, and the focal tube can be formed of a single construction with the front panel. To interconnect the pipes and other connections there can be utilized 0-rings which can sustain up to 350° F, such as standard Buna-N materials.

Of course, it is understood that the number of gallons of heated water which are developed will vary with the parabolic formula of the housing, the size of the focal tube, the number of focal tube used in the first and second rows, as well as other variables. The housing could include safety devices which can be enclosed for the release of excessive air pressure buildup within the housing. A safety sump can also be provided to capture any hot water which may flow out of the housing due to breakage of the tubes. The unit could also be provided with shutters which can be adjusted manually or automatically depending upon temperature use. Bypass piping and automatic temperature transducers offer additional means of control.

The construction of the heat exchanger can be made asthetically pleasing by placing a covering on the outer surface of the housing which can then be painted or decorated inside the home. The heat exchanger is mobile and can be located in any suitable section of a housing. Since more than one such heat exchanger can be placed in any single housing or any structure, each device can be tailored to the true heat load or cooling requirements of the structure. Various units can be predesigned for production units to provide predetermined BTU vs. sun installation conditions in different sections of the country. Pumps and tanks for utilization with the device could also be located indoors with large tanks buried underground to minimize temperature differentials of hot water to outside ambient conditions.

An additional plate can be inserted in the spaces between the inner row and the outer row of the flow tubes to provide additional reflections of the suns rays onto the focal tubes. The parabolic shape and inner volume can be alternated for optimum conditions. This may require material that is reflective to the focal tube and only a short distance from the focal tube such as 1 to 2 inches away. The system can include various valves in addition to the float valve shown in FIG. 5 and the piston valve shown in FIG. 7. Such valves as check valves could be included to interconnect with the heating system or hot water systems.

Referring now to FIGS. 3A there is shown an alternate construction of the housing which includes a parabolic wall 70 having a honeycombed structure 72 positioned adjacent such wall. Such honeycombed structure can be an aluminum extrusion with the inside surface 74 thereof highly polished for high reflectivity an emissivity. This would provide greater efficiency to the system and could also be a means of providing a simplified manufacture since such lengths can be cut on site and provided in the housing.

The heat exchanger of the present invention can utilize any type of a fluid flowing within the focal tube. While water has been heretofore described, other types of liquid can also be used. In addition, gases could be used, such as air.

Referring now to FIG 8 there is shown another embodiment of the heat exchager including a supply line 76 coupled to the top cover 18 of the heat exchanger and located on one side of the focal tube 22. A second pipe 78 is positioned on the bottom cover 20 and is located on the opposite side of the focal tube 22. The pipes 76, 78 would accommodate the flow of hot air under pressure which is blown into the heat exchanger and heated up within the parabolic housing. A baffle 80 can be provided within the exchanger to direct the flow of the air and maintain such air for a greater period of time in the exchanger to heat up to a higher temperature. In such systems, the center focal tube can either be utilized with water, air or other fluid.

Referring now further to FIG. 3, it will be noted that tubes can be rotatable to reflect climatic region and local seasonal conditions such that reflectivity from tubing onto focal tube is variable and can be done without difficulty by the local homeowner or superintendent of a building or apartment house.

There has been disclosed heretofore the best embodiments of the invention presently contemplated. However, it is to be understood that various changes and modifications may be made thereto without departing from the spirit of the invention.

What is claimed is:
1. A solar energy heat exchanger comprising
    a. walls shaped into an open ended parabolic housing;
    b. a transparent flat front plate connecting the ends of the parabolic housing and capable of passing the sun's rays therethrough into the housing, the inner surface of said parabolic housing internally reflecting at least some of the sun's rays reaching it;
    c. a longitudinal focal tube positioned about the focal line of said parabolic housing, capable of retaining a fluid medium therein, and receiving both direct sun rays passing through said front plate and reflected sun rays from said inner surface of the parabolic housing; and
    d. a top and bottom cover on said parabolic housing to form a complete enclosure therewith, and wherein said flat front plate is of glass material, said focal tube is of glass material, said focal tube is molded of one piece with said front plate, and said focal tube is tangential to said front plate.

2. The heat exchanger as in claim 1 and further comprising a first plurality of flow tubes, each of said flow tubes being smaller than said focal tube, said first plurality of flow tubes positioned along a first parabolic line spaced inwardly from the inner surface of said parabolic housing.

3. The heat exchanger as in claim 2 and wherein the outer walls of said first plurality of flow tubes are made of reflective material.

4. The heat exchanger as in claim 2 and wherein the outer walls of said first plurality of flow tubes are made of glass material.

5. The heat exchanger as in claim 2 and further comprising a second plurality of flow tubes, each of said last mentioned flow tubes being smaller than said focal tube, said second plurality of flow tubes positioned along a second parabolic line spaced between said first parabolic line and the inner surface of said parabolic housing.

6. The heat exchanger as in claim 5 and wherein the outer walls of said second plurality of flow tubes are made of reflective material.

7. The parabolic housing as in claim 5 and wherein the outer walls of said second plurality of flow tubes are made of glass material.

8. The heat exchanger as in claim 5 and wherein said first and second plurality of flow tubes are alternately spaced.

9. The heat exchanger as in claim 5 and wherein said top and bottom covers contain holes therein, in registration with said focal tube and said first and second plurality of flow tubes, for providing the entry and exit of a fluid into said tubes.

10. The heat exchanger as in claim 9 and wherein the size of said holes in said top and bottom cover are smaller than the size of the tubes over which they respectively lie.

11. The heat exchanger as in claim 9 and wherein said fluid is water.

12. The heat exchanger as in claim 5 and further comprising a pipe assembly interconnecting said first and second plurality of tubes to provide a flow of fluid into said second plurality of flow tubes, from said second plurality to sid first plurality of flow tubes.

13. The heat exchanger as in claim 12 and wherein said pipe assembly further provides a flow of fluid from said second plurality of flow tubes to said focal tubes.

14. The heat exchanger as in claim 12 and further comprising valve means positioned within said pipe assembly.

15. The heat exchanger as in claim 14 and wherein said valve means is a float valve.

16. The heat exchanger as in claim 14 and wherein said valve means includes piston valves positioned such that a piston valve is arranged for each said plurality of flow tubes.

17. The heat exchanger as in claim 1 and wherein the front semi-cylindrical surface of said focal tube is transparent and the rear semi-cylindrical surface of said focal tube is absorptive.

18. The heat exchanger as in claim 17 and wherein the rear semi-cylindrical surface of said focal tube is coated with a blackened material.

19. The heat exchanger as in claim 1 and wherein said heat exchanger is coupled to a window aperture of a dwelling, said parabolic housing being portable within said dwelling with the front plate serving as the window pane of said aperture.

20. The heat exchanger as in claim 1 and further comprising tracking means coupled to said parabolic housing for following the trajectory path of the sun and maintaining the front plate positioned to face the sun.

21. The heat exchanger as in claim 1 and wherein said walls include a layer of honeycombed wall structure, the inside face of said honeycombed wall structure being highly reflective.

22. The heat exchanger as in claim 21 and wherein said honeycombed wall structure is of aluminum material.

23. The heat exchanger as in claim 21 and wherein the top cover contains an entry tube positioned on one side of said focal tubes for entry of a first fluid into said housing, said bottom cover contains an exit tube positioned on the other side of said focal tube for removal of such first fluid from said housing, and wherein said top and bottom cover further includes holes above and below said focal tube for providing the entry and exit of a second fluid into said focal tube.

24. The heat exchanger as in claim 23 and wherein said first fluid is air and said second fluid is water.

25. The heat exchanger as in claim 23 and further comprising baffle means positioned within said housing for directing the flow of said first fluid within said housing.

26. The heat exchanger as in claim 1 and wherein said walls of said housing are of conductive material which can heat the ambient surrounding said housing.

27. The heat exchanger as in claim 1 and further comprising insulation means contained within said walls of said housing.

28. The heat exchanger as in claim 1 and wherein said housing is constructed of aluminum material.

* * * * *